United States Patent
Sangha et al.

(10) Patent No.: US 11,724,746 B2
(45) Date of Patent: Aug. 15, 2023

(54) CHASSIS ASSEMBLY HAVING MIXED MATERIALS

(71) Applicants: GM Global Technology Operations LLC, Detroit, MI (US); Ftech R&D North America Inc., Troy, MI (US)

(72) Inventors: Balbir Singh Sangha, Ajax (CA); Len V. Peschansky, West Bloomfield, MI (US); Manish Pamwar, Whitby (CA); Fred M. Marquardt, Commerce, MI (US); William R. Rodgers, Bloomfield Township, MI (US); Bruce N. Greve, Clarkston, MI (US); David Kennedy, Farmington Hills, MI (US); Adrian Bica, Markham (CA); Bikramjit Sarkaria, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 17/500,613

(22) Filed: Oct. 13, 2021

(65) Prior Publication Data

US 2023/0110672 A1    Apr. 13, 2023

(51) Int. Cl.
*B62D 21/00*    (2006.01)
*B62D 25/00*    (2006.01)

(52) U.S. Cl.
CPC ............. *B62D 25/00* (2013.01); *B62D 21/00* (2013.01)

(58) Field of Classification Search
CPC ................................ B62D 21/10; B62D 21/00
See application file for complete search history.

(56) References Cited

U.S. PATENT DOCUMENTS 6,299,240 B1 * 10/2001  Schroeder ............ B62D 29/008
                                                                 296/29
6,666,501 B1 * 12/2003  Logan ................ B62D 25/2036
                                                              296/193.07

(Continued)

FOREIGN PATENT DOCUMENTS

CN    107472360 A    * 12/2017
CN    109606470 A    *  4/2019    ............. B62D 21/00

(Continued)

OTHER PUBLICATIONS

WO2019207986A1 machine translation from espacenet.com Feb (Year: 2023).*

*Primary Examiner* — Paul N Dickson
*Assistant Examiner* — Maxwell L Meshaka
(74) *Attorney, Agent, or Firm* — Vivacqua Crane PLLC

(57) ABSTRACT

A chassis assembly having mixed material for reduced mass is provided. The assembly comprises an upper structure comprised of metal. The upper structure has a plurality of first bond surfaces, each of which is parallel with each other at varying elevations relative to a z-axis of a 3-dimensional coordinate thereof. The assembly further comprises a lower structure made of a polymer composite. The lower structure has a plurality of second bond surfaces, each of which is parallel with each other at varying elevations relative to the z-axis thereof. The second bond surfaces are arranged to align with the first bond surfaces in complementing relation such that the lower structure is joined with the upper structure at the first and second bond surfaces. The assembly further comprises an adhesive disposed between the first and second bond surfaces to join the lower and upper structures at the first and second bond surfaces, defining a bond gap between the first and second bond surfaces.

20 Claims, 7 Drawing Sheets

(56) References Cited

U.S. PATENT DOCUMENTS

| | | | | |
|---|---|---|---|---|
| 6,712,392 | B2* | 3/2004 | Young | B62D 21/00 |
| | | | | 180/311 |
| 2003/0227164 | A1* | 12/2003 | Young | B62D 65/00 |
| | | | | 280/781 |
| 2004/0108705 | A1* | 6/2004 | Witucki | B62D 21/00 |
| | | | | 280/781 |
| 2017/0066485 | A1* | 3/2017 | Yamaguchi | B62D 65/02 |
| 2018/0009050 | A1* | 1/2018 | Tokita | B23K 33/00 |
| 2022/0089225 | A1* | 3/2022 | Kaiser | B62D 63/025 |
| 2022/0105556 | A1* | 4/2022 | Hayashi | B21D 47/00 |
| 2022/0134801 | A1* | 5/2022 | Rodgers | B29C 70/747 |
| | | | | 301/64.101 |
| 2022/0348263 | A1* | 11/2022 | Nagano | C21D 6/005 |

FOREIGN PATENT DOCUMENTS

| | | | | | |
|---|---|---|---|---|---|
| CN | 109649493 | A | * | 4/2019 | ......... B23K 20/129 |
| CN | 112606906 | A | * | 4/2021 | ............... B60P 3/36 |
| CN | 114684272 | A | * | 7/2022 | |
| CN | 114987616 | A | * | 9/2022 | |
| DE | 102012215098 | A1 | | 5/2014 | |
| DE | 102013227185 | A1 | | 7/2014 | |
| DE | 102015000026 | A1 | * | 7/2015 | ............ B62D 21/00 |
| DE | 102019201267 | A1 | * | 8/2019 | ............ B62D 21/00 |
| EP | 3594093 | A1 | * | 1/2020 | ............ B62D 21/00 |
| GB | 2495596 | A | * | 4/2013 | ......... B62D 25/088 |
| KR | 20090064230 | A | * | 6/2009 | |
| KR | 20130005378 | A | * | 1/2013 | |
| KR | 20160143359 | A | * | 12/2016 | |
| KR | 20220128694 | A | * | 9/2022 | |
| WO | WO-2006040741 | A1 | * | 4/2006 | ............ B62D 21/11 |
| WO | WO-2010122411 | A1 | * | 10/2010 | ............ B62D 21/10 |
| WO | WO-2018113772 | A1 | * | 6/2018 | ............... B60K 1/00 |
| WO | WO-2019207986 | A1 | * | 10/2019 | |

* cited by examiner

CHASSIS ASSEMBLY HAVING MIXED MATERIALS

INTRODUCTION

The present disclosure relates to automotive chassis assemblies and more particularly chassis assemblies having mixed materials for reduced mass.

Light weight chassis designs are desirable. However, light weight designs are typically relatively expensive and thus, at times, cost prohibitive. Moreover, in reducing overall mass, manufacturers face challenges to achieve performance targets related to stiffness, strength, durability, noise, vibration, ride and handling, and crash response.

SUMMARY

Thus, while current chassis assemblies achieve their intended purpose, there is a need for a new and improved chassis assembly.

In accordance with one aspect of the present disclosure, a chassis assembly having mixed material for reduced mass is provided. The assembly comprises an upper structure being one of a metallic single piece or a metallic multi-piece. The upper structure has a plurality of first bond surfaces. The first bond surfaces are parallel with each other at varying elevations relative to a z-axis of a 3-dimensional coordinate thereof.

In this aspect, the assembly further comprises a lower structure made of a polymer composite. The lower structure has a plurality of second bond surfaces. The second bond surfaces are parallel with each other at varying elevations relative to the z-axis thereof. The second bond surfaces are arranged to align with the first bond surfaces in complementing relation such that the lower structure is joined with the upper structure at the first and second bond surfaces. The assembly further comprises an adhesive disposed between the first and second bond surfaces to join the lower and upper structures at the first and second bond surfaces, defining a bond gap between the first and second bond surfaces.

In one embodiment of this aspect, the one of the metallic single piece or the metallic multi-piece comprises one of steel and aluminum. In another embodiment, the polymer composite reinforcement comprises one of glass fiber and carbon fiber and basalt fiber and ultrahigh molecular weight polyethylene fiber and Poly-paraphenylene terephthalamide fiber and wollastonite.

In another embodiment of this aspect, the bond gap is between 0.25 millimeter and 1.5 millimeter. In yet another embodiment, the bond gap is between 0.5 millimeter and 1 millimeter. In still another embodiment, the bond gap is between 0.6 millimeter and 0.8 millimeter. In still another embodiment, the adhesive comprises to these but not limited to one of an epoxy based adhesive, a urethane based or an acrylic based adhesive. In another example, any adhesive that can be used as a structural adhesive having a modulus equal to or greater than 500 MPa and a tensile strength equal to or greater than 10 MPa.

In one embodiment of this aspect, the upper structure comprises an upper hollow portion and the lower structure comprises a lower hollow portion. The upper and lower hollow portions are arranged to be joined with each other defining a closed hollow portion of the assembly.

In another embodiment, at least one mechanical fastener disposed through one of the second bond surfaces of the lower structure and extending through the upper structure. The upper structure comprises a protection rib formed thereon opposite one of the first bond surfaces and disposed about the mechanical fastener.

In yet another embodiment, the upper portion comprises a pair of brackets formed thereon opposite one of the first bond surfaces.

In accordance with another aspect of the present disclosure, a chassis assembly having mixed material for reduced mass is provided. The assembly comprises an upper structure being one of a metallic single piece and a metallic multi-piece. The upper structure has a plurality of first bond surfaces. Each of the first bond surfaces is parallel with each other at varying elevations relative to a z-axis of a 3-dimensional coordinate thereof.

In this aspect, the assembly comprises a lower structure comprising one of fiber reinforced composite, such as glass fiber or carbon fiber. The lower structure has a plurality of second bond surfaces. Each of the second bond surfaces is parallel with each other at varying elevations relative to the z-axis thereof. The second bond surfaces are arranged to align with the first bond surfaces in complementing relation such that the lower structure is joined with the upper structure at the first and second bond surfaces.

The assembly further comprises an adhesive disposed between the first and second bond surfaces to join the lower and upper structures at the first and second bond surfaces, defining a bond gap of between 0.25 millimeter and 1.5 millimeter between the first and second bond surfaces. In this aspect, the assembly comprises at least one mechanical fastener disposed through one of the second bond surfaces of the lower structure and extending through the upper structure. The upper structure comprises a protection rib formed thereon opposite one of the first bond surfaces and disposed about the mechanical fastener.

In one embodiment, the one of the metallic single piece and the metallic multi-piece comprises one of steel and aluminum. In another embodiment, the polymer composite reinforcement is one of glass fiber, carbon fiber, and fiber reinforcing material.

In yet another embodiment, the bond gap is between 0.5 millimeter and 1 millimeter. In still another embodiment, the bond gap is between 0.6 millimeter and 0.8 millimeter. In one other embodiment, the adhesive comprises one of an epoxy based adhesive, a urethane based adhesive, and an acrylic based adhesive.

In one embodiment, the upper structure comprises an upper hollow portion and the lower structure comprises a lower hollow portion. The upper and lower hollow portions are arranged to be joined with each other defining a closed hollow portion of the assembly. In another embodiment, the upper portion comprises a pair of brackets formed thereon opposite one of the first bond surfaces.

In accordance with another aspect of the present disclosure, a method of manufacturing a chassis assembly having mixed material for reduced mass is provided. The method comprises providing an upper structure being one of a metallic single piece and a metallic multi-piece. The upper structure comprises a plurality of first flanges. Each first flange has a first bond surface. The first bond surfaces are parallel with each other at varying elevations relative to a z-axis of a 3-dimensional coordinate thereof.

The method further comprises providing a lower structure made of a polymer composite. The lower structure comprises a plurality of second flanges. Each second flange has a second bond surface. The second bond surfaces are parallel with each other at varying elevations relative to the z-axis thereof. The second bond surfaces are arranged to align with the first bond surfaces in complementing relation such that the lower structure is joined with the upper structure at the first and second bond surfaces.

The method further comprises applying an adhesive on the second bond surfaces and aligning the first bond surfaces with the second bond surfaces.

The method further comprises joining the lower structure with the upper structure at the first and second bond surfaces such that the adhesive is disposed between the first and second bond surfaces, defining a bond gap of between 0.25 millimeter and 1.5 millimeter between the first and second bond surfaces.

In one embodiment, the polymer composite reinforcement comprises one of glass fiber and carbon fiber or both.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure provides chassis assemblies having mixed materials for reduced mass and methods of manufacturing such chassis assemblies. As typical chassis are manufactured as a single-material one-part component, the present disclosure provides a mixed material two-part assembly comprising an upper structure and a lower structure that are joined in a single bonding process. The upper structure is comprised of metal and the lower structure is comprised of a polymer composite, resulting in a chassis assembly with relatively reduced mass while achieving performance targets related to stiffness, strength, durability, noise, vibration, ride and handling, and crash response.

Figure 1A:
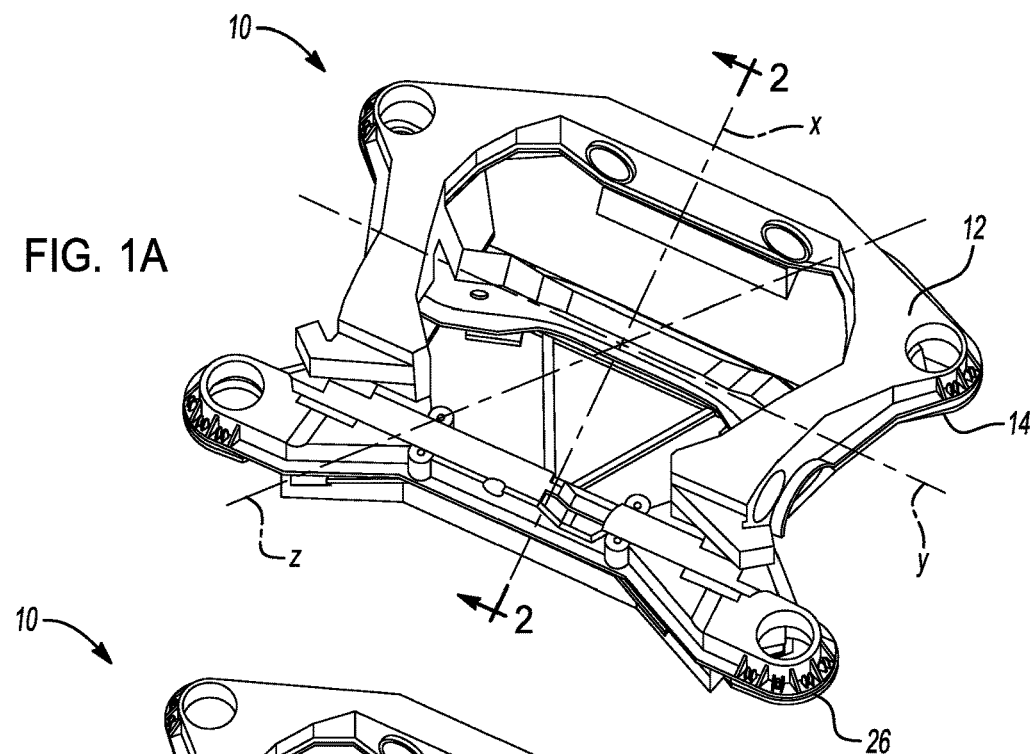
FIG. 1A is a perspective view of a chassis assembly in accordance with one embodiment of the present disclosure.
Figure 1B:
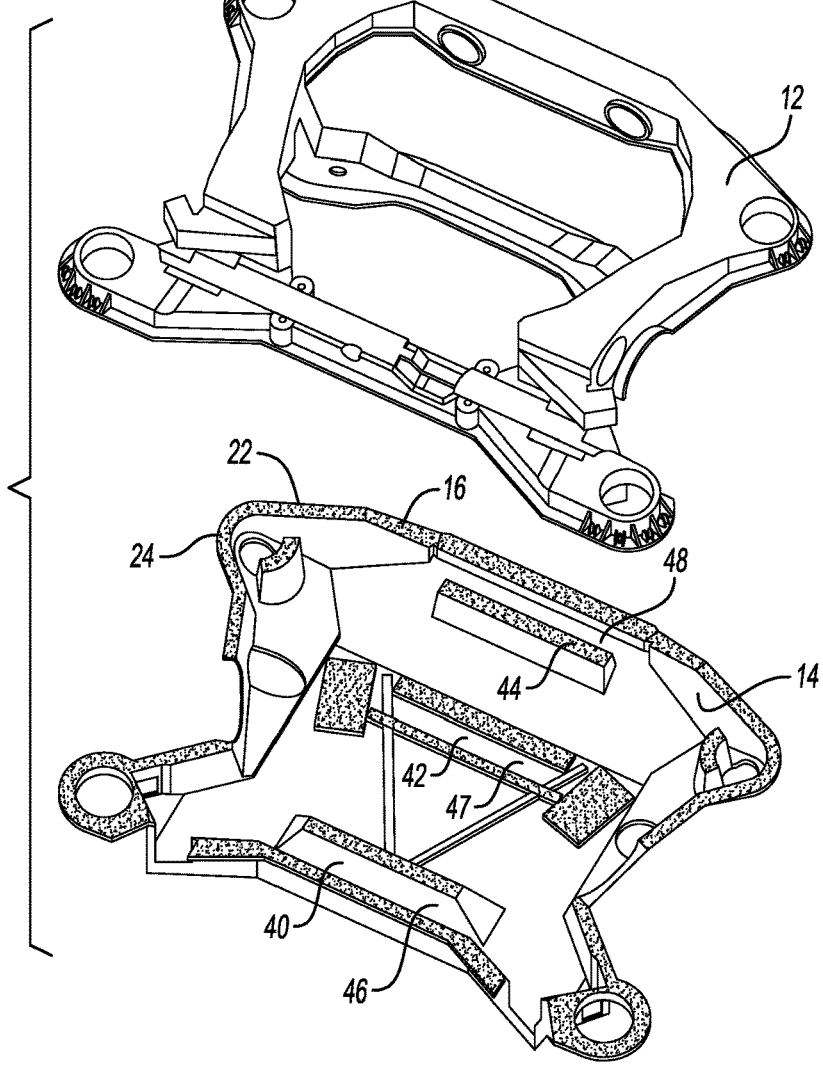
FIG. 1B is a breakaway view of the assembly of FIG. 1A.
Figure 1C:
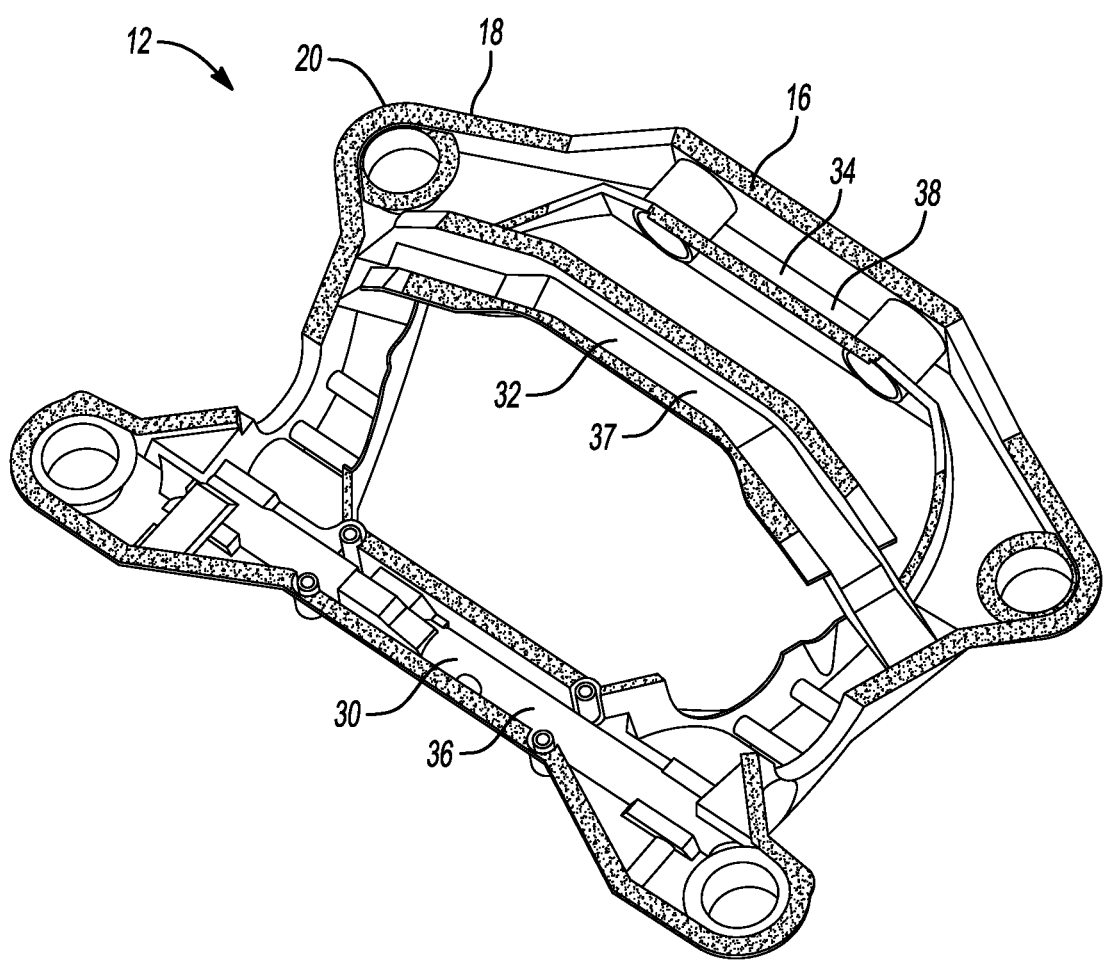
FIG. 1C is a perspective view of an upper portion of the assembly of FIG. 1A.
Figure 4:
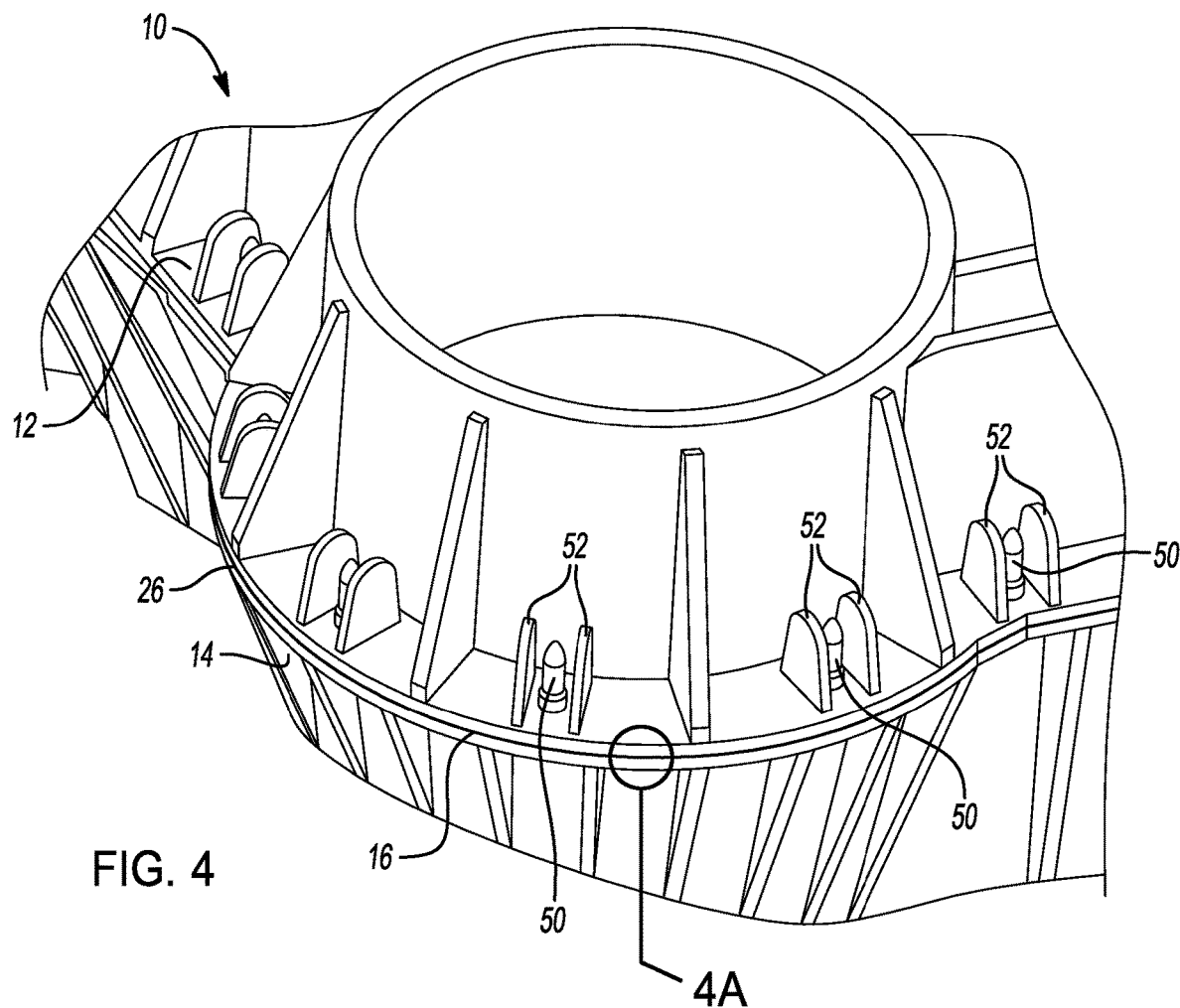
FIG. 4 is partial view of the chassis assembly having protection ribs in accordance with another embodiment of the present disclosure.
Figure 4A:
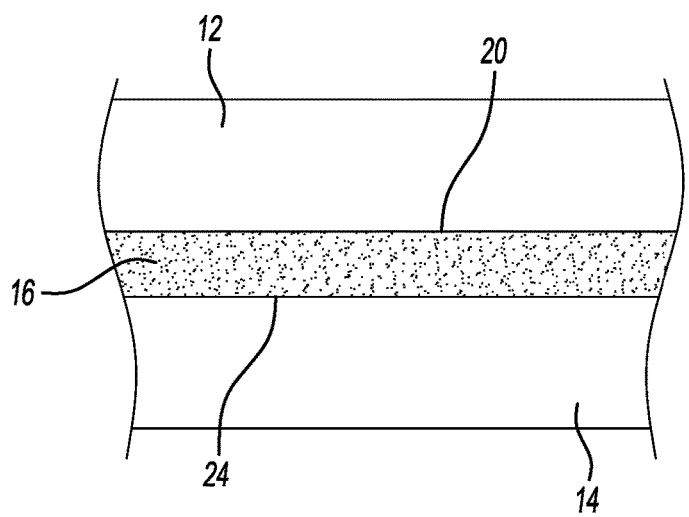
FIG. 4A is an enlarged view of circle 4A in FIG. 4.

In accordance with one aspect of the present disclosure, FIGS. 1A-1B and 4A illustrate a chassis assembly 10 having mixed materials for reduced mass. As shown, the assembly 10 comprises an upper structure 12 and a lower structure 14 joined by an adhesive 16. In this embodiment, the upper structure 12 is comprised of metal and may be a single workpiece. In other embodiments, the upper structure 12 may be comprised of multiple parts. As depicted in FIGS. 1B-1C and 4A, the upper structure 12 has a plurality of first flanges 18 wherein each first flange 18 comprises a first bond surface 20. As shown, the first bond surfaces 20 are parallel with each other at varying elevations relative to a z-axis of a 3-dimensional coordinate thereof. It is to be understood that the upper structure 12 may be made of any suitable metal or metal alloy such as steel, aluminum, or magnesium without departing from the spirit or scope of the present invention.

FIGS. 1A and 1B depict the assembly 10 further comprising the lower structure 14 made of a polymer composite for structural reinforcement and underbody protection. As shown, the lower structure 14 has a plurality of second flanges 22 wherein each second flange 22 comprises a second bond surface. The second bond surfaces 24 are parallel with each other at varying elevations relative to the z-axis thereof. The second bond surfaces 24 are arranged to align with the first bond surfaces 20 in complementing relation such that the lower structure 14 is joined with the upper structure 12 at the first and second bond surfaces 20, 24. When joined with the metal of the first bond surfaces 20, the polymer composite of the second bond surfaces 24 allow for reduced galvanic corrosion. Additionally, galvanic corrosion may be reduced in a number of ways. In one example, the second flanges may only be made using glass fiber reinforcement. In another example, the second flanges may be made using carbon fiber reinforcement wherein a glass fiber reinforcement layer may be added on the second bond surfaces during molding. In this example, the glass fiber layer serves to isolate metal from being in direct contact with the carbon fiber and hence reduce the risk of potential galvanic corrosion. It is to be understood that the lower structure 14 may be made of any suitable polymer composite such as carbon fiber reinforced or glass fiber reinforced or both without departing from the spirit or scope of the present invention. Moreover, it is also to be understood that the reinforced polymer composite may be a composite material made of a polymer reinforced with fibers such as, but not limited to, one of carbon fibers, glass fibers, and basalt fibers. The polymer may be any suitable polymer without departing from the spirit or scope of the present disclosure.

FIGS. 1B and 4A show the assembly 10 further comprising the adhesive 16 disposed between the first and second bond surfaces 20, 24 to join the upper and lower structures 12, 14 at the first and second bond surfaces 20, 24. As shown, placement of the adhesive 16 between the first and second bond surfaces 20, 24 defines a bond gap 26 between the first and second bond surfaces 20, 24. In one embodiment, the bond gap 26 may be between 0.25 millimeter and 1.5 millimeter, preferably between 0.5 millimeter and 1 millimeter, and more preferably between 0.6 millimeter and 0.8 millimeter.

Moreover, the adhesive 16 may comprise one of an epoxy based adhesive, a urethane based adhesive, and an acrylic based adhesive. It is to be understood that any suitable epoxy based adhesive, urethane based adhesive, or acrylic based adhesive may be used without departing from the spirit or scope of the present disclosure. Examples of adhesives 16 may be but not limited to Fusor® 380NS/383NS Adhesive from LORD/Parker or Pliogrip™ 5760B/400 from Ashland without departing from the spirit or scope of the present disclosure.

FIGS. 1C-3C show the upper structure 12 comprises a first front portion 30, a first mid portion 32, and a first rear portion 34. As depicted, each of the front portion, the mid portion, and the rear portion is integrally formed with the upper structure 12 having first flanges 18 and first bond surfaces 20 being parallel with each other at varying elevations relative to the z-axis thereof. In this embodiment, the first front portion 30, the first mid portion 32, and the first rear portion 34 are hollow, defined by first hollow cores 36, 37, 38, respectively.

Moreover, FIGS. 1C-3C depict the lower structure 14 comprising a second front portion 40, a second mid portion 42, and a second rear portion 44. Each of the second front portion 40, the second mid portion 42, and the second rear portion 44 is integrally formed with the lower structure 14 having second flanges 22 and second bond surfaces 24 being parallel with each other at varying elevations relative to the z-axis thereof. In this embodiment, the second front portion 40, the second mid portion 42, and the second rear portion 44 are hollow, defined by second hollow cores 46, 47, 48, respectively.

Figure 2:
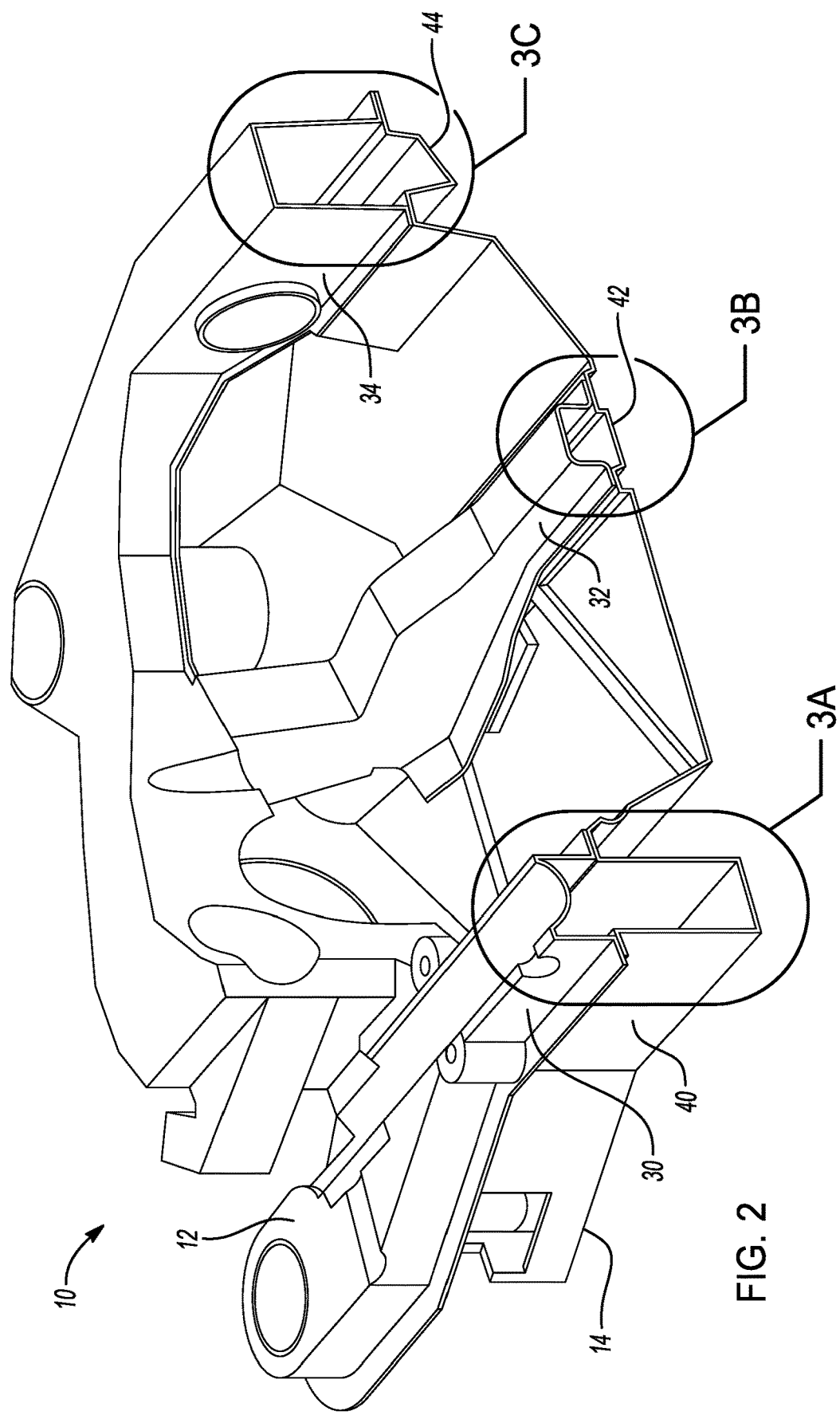
FIG. 2 is a cross sectional view of the assembly in FIG. 1A, taken along lines 2-2.
Figure 3A:
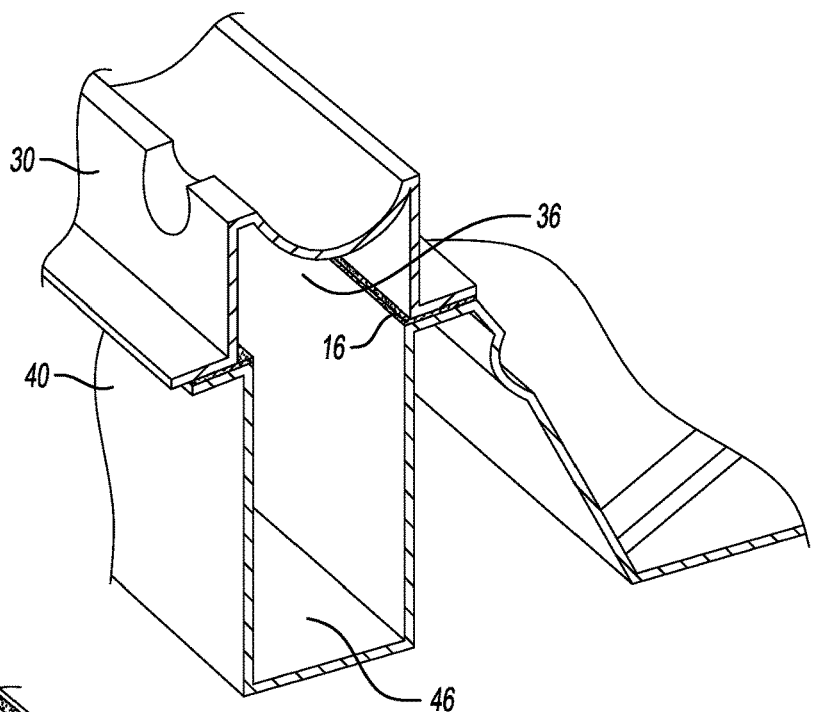
FIG. 3A is an enlarged view of circle 3A in FIG. 2.
Figure 3B:
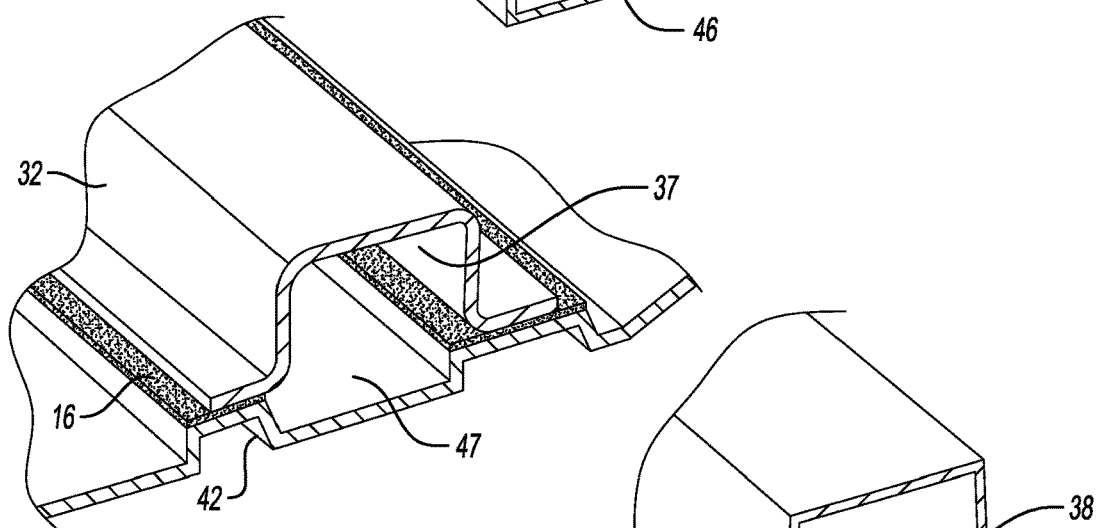
FIG. 3B is an enlarged view of circle 3B in FIG. 2.
Figure 3C:
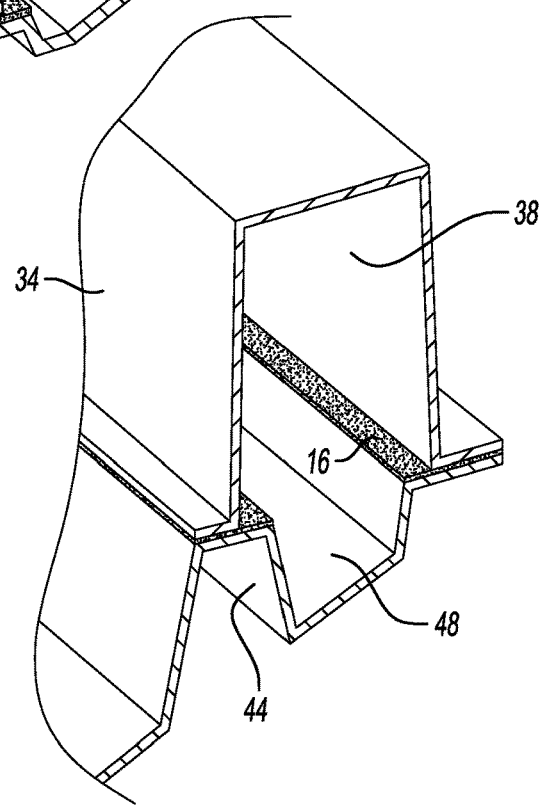
FIG. 3C is an enlarged view of circle 3C in FIG. 2.

As shown in FIGS. 2-3C, the second front portion 40, the second mid portion 42, and the second rear portion 44 is formed integrally with the lower structure 14 such that the lower structure 14 is joined with the upper structure 12 at the first and second bond surfaces 20, 24 in complementing relation. That is, the second bond surfaces 24 of the second front portion 40 are arranged to align with the first bond surfaces 20 of the first front portion 30, the second bond surfaces 24 of the second mid portion 42 are arranged to align with the first bond surfaces 20 of the first mid portion 32, and the second bond surfaces 24 of the second rear portion 44 are arranged to align with the first bond surfaces 20 of the first rear portion 34 in complementing relation. As depicted in FIGS. 2-3C, the lower structure 14 is joined with the upper structure 12 in complementing relation such that the first and second front portions 30, 40 are closed, the first and second mid portions 32, 42 are closed, and the first and second rear portions 34, 44 are closed. This achieves hollow portion and further contributes to overall mass reduction of the assembly 10. Furthermore, the upper and lower structures 12, 14 are preferably joined in one simultaneous joining process or a single shot bonding.

It is to be understood that the upper structure 12 may be formed by stamping, welding, casting or any other suitable manner without departing from the spirit or scope of the present disclosure. It is also to be understood that the lower structure 14 may be formed by compression molding, resin transfer molding, autoclave molding or any other suitable manner without departing from the spirit or scope of the present disclosure.

FIGS. 1A-1B and 4 illustrate the assembly 10 comprising at least one mechanical fastener 50, preferably a plurality of mechanical fasteners 50, disposed through one of the second bond surfaces 24 of the lower structure 14 and extending through the upper structure 12. For each mechanical fastener 50, the upper structure 12 comprises protection ribs 52, e.g., a pair, formed thereon. As shown, the protection ribs 52 are formed on the upper structure 12 opposite one of the first bond surfaces 20 and disposed about the mechanical fastener 50 allowing for enhanced safety in handling the assembly 10. The mechanical fasteners 50 may be used where there is a desire to further secure the upper and lower structures together. It is to be understood that a flow drill screw or any other suitable fastener may be used without departing from the spirit or scope of the present disclosure.

Figure 5:
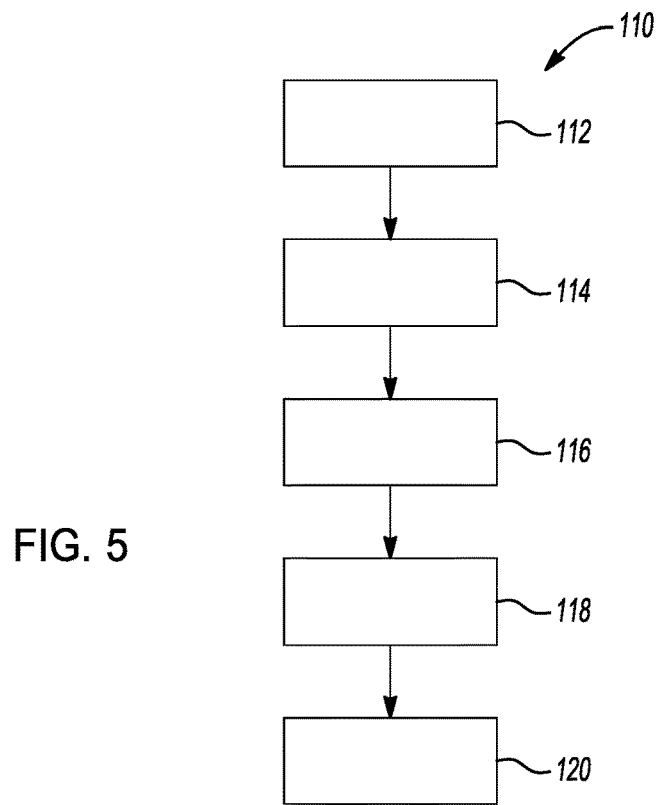
FIG. 5 is a flowchart for a method of manufacturing a chassis assembly having mixed material for reduced mass in accordance with one example of the present disclosure.

FIG. 5 shows a flowchart of a method 110 for manufacturing the chassis assembly 10 (FIGS. 1A-1C) having mixed materials for reduced mass in accordance with another aspect of the present disclosure. As shown, the method 110 comprises a step of providing in box 112 the upper structure 12, e.g. the upper structure 12 discussed above, comprised of metal and being a single workpiece. In other examples, the upper structure 12 may be comprised of multiple parts. As depicted in FIGS. 1B and 1C, the upper structure 12 has a plurality of first flanges 18 wherein each first flange 18 comprises a first bond surface 20. As shown, the first bond surfaces 20 are parallel with each other at varying elevations relative to a z-axis of a 3-dimensional coordinate thereof. It is to be understood that the upper structure 12 may be made of any suitable metal or metal alloy such as steel or aluminum without departing from the spirit or scope of the present invention.

As shown in FIG. 5, the method 110 further comprises a step of providing in box 114 the lower structure 14 (FIGS. 1A-1C and discussed above) made of a polymer composite for structural reinforcement and underbody protection. As shown FIGS. 1A and 1B, the lower structure 14 has a plurality of second flanges 22 wherein each second flange 22 comprises a second bond surface. The second bond surfaces 24 are parallel with each other at varying elevations relative to the z-axis thereof. The second bond surfaces 24 are arranged to align with the first bond surfaces 20 in complementing relation such that the lower structure 14 is joined with the upper structure 12 at the first and second bond surfaces 20, 24. When joined with the metal of the first bond surfaces 20, the polymer composite of the second bond surfaces 24 allow for reduced galvanic corrosion. Additionally, galvanic corrosion may be reduced in a number of ways. In one example, second flanges may only be reinforced using glass fiber. In another example, the second flanges may be reinforced using carbon fiber wherein a glass fiber layer may be added on the second bond surfaces during molding. In this example, the glass fiber layer will serve to isolate the metal from being in direct contact with the carbon fiber and hence reduce the risk of potential galvanic corrosion. It is to be understood that the lower structure 14 may be made of any suitable polymer composite such as carbon fiber reinforced or glass fiber reinforced or both without departing from the spirit or scope of the present invention.

As depicted, the method 110 further comprises a step of applying in box 116 an adhesive 16 on the second bond surfaces 24. Moreover, the adhesive 16 may comprise one of an epoxy based adhesive, a urethane based adhesive, and an acrylic based adhesive. It is to be understood that any suitable epoxy based adhesive, urethane based adhesive, or acrylic based adhesive may be used without departing from the spirit or scope of the present disclosure. Examples of adhesive 16s may be Fusor® 380NS/383NS Adhesive 16 from LORD/Parker or Pliogrip™ 5760B/400 from Ashland without departing from the spirit or scope of the present disclosure.

In this example, the method 110 further comprises a step of aligning in box 118 the first bond surfaces 20 with the second bond surfaces 24. As shown, the adhesive 16 is disposed between the first and second bond surfaces 20, 24 to join the upper and lower structures 12, 14 at the first and second bond surfaces 20, 24. The steps of applying the adhesive 16 and aligning the first bond surface 20 with the second bond surfaces 24 may be accomplished by any suitable manner known in the art without departing from the spirit or scope of the present disclosure. For example, the lower structure 14 may be held on a stationary platform, fixture, or apparatus (not shown). In this example, as the lower structure 14 is held stationary, a nozzle apparatus may be used to apply the adhesive 16 on the second bond surfaces 24 of the lower structure 14. Then, a movable apparatus (not shown) may be used to move, lift and lower the upper structure 12 on the lower structure 14 and align the first bond surfaces 20 with the second bond surfaces 24.

The method 110 further comprises a step of joining in box 120 the upper and lower structures 12, 14 by lowering the upper structure 12 and adjusting the position of the upper structure 12. Lowering and adjusting the upper structure 12 on the lower structure 14 joins the lower structure 14 with the upper structure 12 at the first and second bond surfaces 20, 24 such that the adhesive 16 is disposed between the first and second bond surfaces 20, 24. As the upper and lower structures 12, 14 are joined at the first and second bond surfaces 20, 24, a bond gap 26 is defined between the first and second bond surfaces 20, 24. Thus, the upper and lower structures 12, 14 are preferably joined in one simultaneous joining process or a single shot bonding.

In one example, the bond gap 26 may be between 0.25 millimeter and 1.5 millimeter. In another example, the bond gap 26 may be between 0.5 millimeter and 1 millimeter. In yet another example, the bond gap 26 may be between 0.6 millimeter and 0.8 millimeter.

As the upper and lower structures 12, 14 are joined, the assembly 10 is held in place on the fixture (not shown) to allow for curing of the adhesive 16 between the first and second bond surfaces 20, 24. Curing times may vary, depending on the adhesive 16 used. As only an example, the curing time may be between 2 minutes and 24 hours.

Figure 6A:
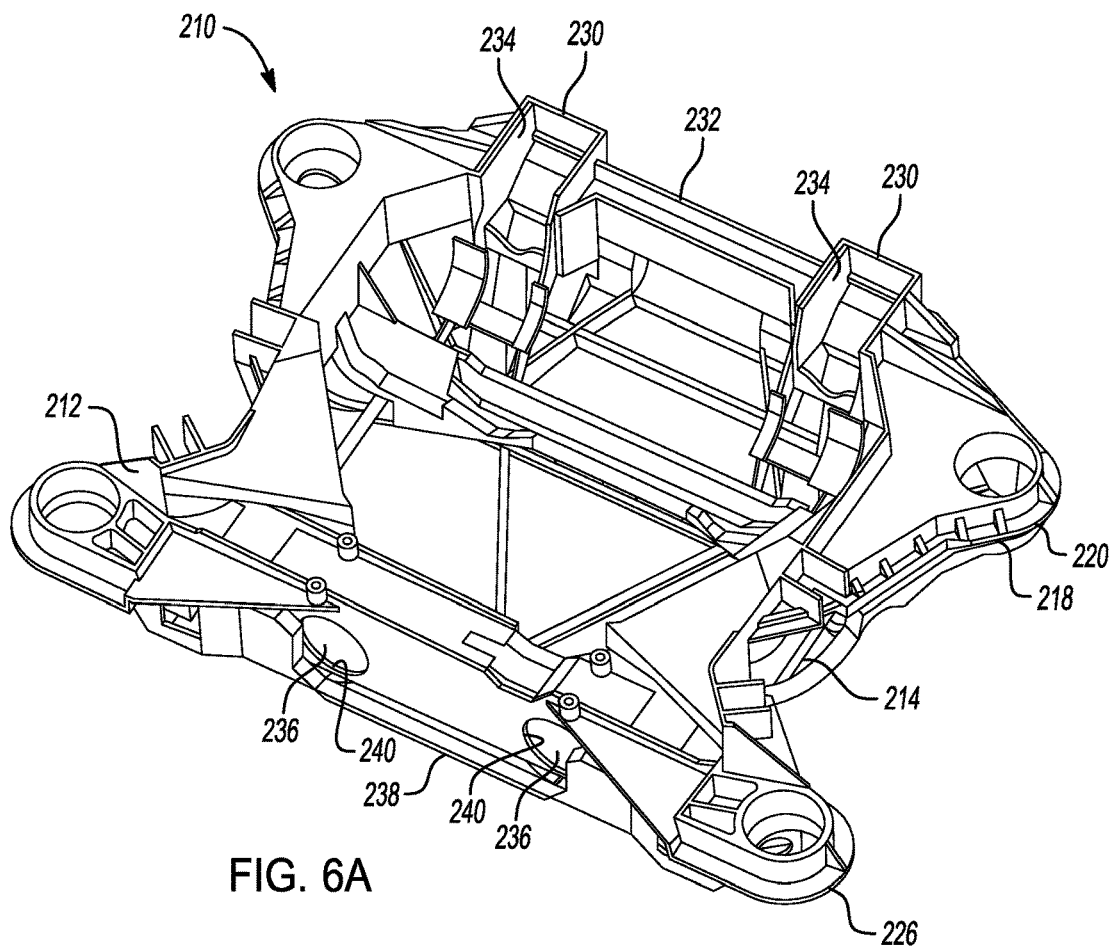
FIG. 6A is a perspective view of a chassis assembly having brackets in accordance with another embodiment of the present disclosure.
Figure 6B:
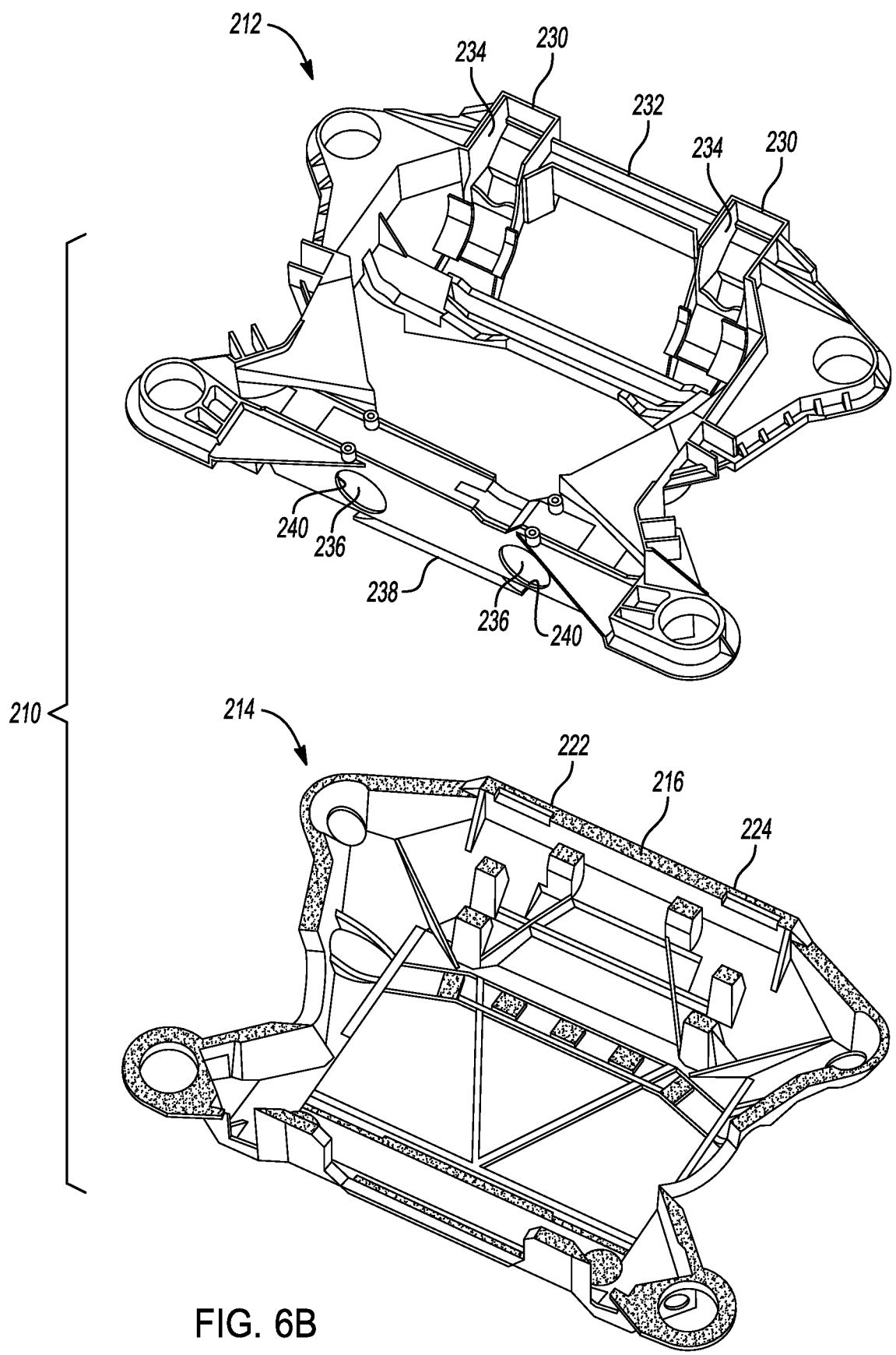
FIG. 6B is an exploded view of the assembly in FIG. 6A.

FIGS. 6A and 6B illustrate a chassis assembly 210 having mixed materials for reduced mass in accordance with another embodiment of the present disclosure. As shown, the assembly 210 comprises an upper structure 212 and a lower structure 214 joined by an adhesive 216. As in the assembly 10 of FIGS. 1A-1C and 4A, the upper structure 212 is comprised of metal and may be a single workpiece. In other embodiments, the upper structure 212 may be comprised of multiple parts. As in the assembly 10 of FIGS. 1A-1C and 4A, the upper structure 212 in FIGS. 6A and 6B also has a plurality of first flanges 218 wherein each first flange 218 comprises a first bond surface 220. As such, the first bond surfaces 220 are parallel with each other at varying elevations relative to a z-axis of a 3-dimensional coordinate thereof. It is to be understood that the upper structure 212 may be made of any suitable metal or metal alloy such as steel or aluminum without departing from the spirit or scope of the present invention.

FIGS. 6A and 6B depict the assembly 210 further comprising a lower structure 214 made of a polymer composite. As shown, the lower structure 214 has a plurality of second flanges 222 wherein each second flange 222 comprises a second bond surface. The second bond surfaces 224 are parallel with each other at varying elevations relative to the z-axis thereof. The second bond surfaces 224 are arranged to align with the first bond surfaces 220 in complementing relation such that the lower structure 214 is joined with the upper structure 212 at the first and second bond surfaces 220, 224. It is to be understood that the lower structure 214 may be made of any suitable polymer composite such as carbon fiber reinforced or glass fiber reinforced or both without departing from the spirit or scope of the present invention.

As in the assembly 10 of FIGS. 1A-1C, FIG. 6B shows the assembly 210 further comprising an adhesive 216 disposed between the first and second bond surfaces 220, 224 to join the upper and lower structures 212, 214 at the first and second bond surfaces 220, 224. As shown, placement of the adhesive 216 between the first and second bond surfaces 220, 224 defines a bond gap 226 between the first and second bond surfaces 220, 224. In one embodiment, the bond gap 226 may be between 0.25 millimeter and 1.5 millimeter, preferably between 0.5 millimeter and 1 millimeter, and more preferably between 0.6 millimeter and 0.8 millimeter.

Moreover, the adhesive 216 may comprise one of an epoxy based adhesive, an urethane based adhesive, and an acrylic based adhesive. It is to be understood that any suitable epoxy based adhesive, urethane based adhesive, or acrylic based adhesive 216 may be used without departing from the spirit or scope of the present disclosure. Examples of adhesive 216*s* may be Fusor® 380NS/383NS Adhesive 216 from LORD/Parker or Pliogrip™ 5760B/400 from Ashland without departing from the spirit or scope of the present disclosure.

It is to be understood that the upper structure may be formed by stamping, welding, casting or any other suitable manner without departing from the spirit or scope of the present disclosure. It is also to be understood that the lower structure may be formed by compression molding, resin transfer molding, autoclave molding or any other suitable manner without departing from the spirit or scope of the present disclosure.

As shown in FIGS. 6A and 6B, the upper portion comprises mounting brackets 230 formed on a rear end 232 of the upper portion and opposite one of the first bond surfaces 220. Preferably, the brackets 230 are integrally formed with the upper portion. Alternatively, the brackets 230 may be separate components and attached by any suitable manner to the upper portion without departing from the spirit or scope of the present disclosure. As depicted, each bracket 230 comprises a pair of opposed walls 234 to which vehicle components may be mounted. Moreover, the upper portion comprises cylindrical bores 236 formed at a front end 238 of the upper portion, defining drive unit mounts 240. The cylindrical bores 236 allow drive unit components to extend therethrough during vehicle manufacturing. It is understood that other application for the cylindrical bore may be used without departing from the spirit or scope of the present disclosure.

It is to be understood that attachments of other components, such as suspension links and steering gear, to the upper metallic structures. Moreover, it is to be understood that as a result bolt creep is eliminated or reduced.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A chassis assembly having mixed material for reduced mass, the assembly comprising:
   an upper structure being one of a metallic single piece and a metallic multi-piece, the upper structure having a plurality of first bond surfaces, each of the first bond surfaces being parallel with each other at varying elevations relative to a z-axis of a 3-dimensional coordinate thereof;
   a lower structure made of a polymer composite, the lower structure having a plurality of second bond surfaces, each of the second bond surfaces being parallel with each other at varying elevations relative to the z-axis thereof, the second bond surfaces being arranged to align with the first bond surfaces in complementing relation such that the lower structure is joined with the upper structure at the first and second bond surfaces; and an adhesive disposed between and in direct contact with the first and second bond surfaces to join the lower and upper structures at the first and second bond surfaces, defining a bond gap between the first and second bond surfaces, wherein the first bond surfaces are disposed above the second bond surfaces when the lower and upper structures are joined.

2. The assembly of claim 1 wherein the one of the metallic single piece and the metallic multi-piece comprises one of steel and aluminum.

3. The assembly of claim 1 wherein the polymer composite reinforcement comprises one of glass fiber and carbon fiber.

4. The assembly of claim 1 wherein the bond gap is between 0.25 millimeter and 1.5 millimeter.

5. The assembly of claim 1 wherein the bond gap is between 0.5 millimeter and 1 millimeter.

6. The assembly of claim 1 wherein the bond gap is between 0.6 millimeter and 0.8 millimeter.

7. The assembly of claim 1 wherein the adhesive comprises one of an epoxy based adhesive, a urethane based adhesive, and an acrylic based adhesive.

8. The assembly of claim 1 wherein the upper structure comprises an upper hollow portion and the lower structure comprises a lower hollow portion, the upper and lower hollow portion arranged to be joined with each other defining a closed hollow portion of the assembly made out of mixed material.

9. The assembly of claim 1 further comprising at least one mechanical fastener disposed through the second bond surface of the lower structure and extending through the upper structure, the upper structure comprising a protection rib formed thereon opposite one of the first bond surfaces and disposed about the mechanical fastener.

10. The assembly of claim 1 wherein the upper portion comprises a pair of brackets formed thereon opposite one of the first bond surfaces.

11. The assembly of claim 1 wherein the one of the metallic single piece and the metallic multi-piece comprises one of steel and aluminum.

12. The assembly of claim 1 wherein the polymer composite reinforcement comprises one of glass fiber and carbon fiber.

13. The assembly of claim 1 wherein the bond gap is between 0.5 millimeter and 1 millimeter.

14. The assembly of claim 1 wherein the bond gap is between 0.6 millimeter and 0.8 millimeter.

15. The assembly of claim 1 wherein the adhesive comprises one of an epoxy based adhesive, a urethane based adhesive, and an acrylic based adhesive.

16. The assembly of claim 1 wherein the upper structure comprises an upper hollow portion and the lower structure comprises a lower hollow portion, the upper and lower hollow portion arranged to be joined with each other defining a closed hollow portion of the assembly.

17. The assembly of claim 1 wherein the upper portion comprises a pair of brackets formed thereon opposite one of the first bond surfaces.

18. A chassis assembly having mixed material for reduced mass, the assembly comprising:

an upper structure being one of a metallic single piece and a metallic multi-piece, the upper structure having a plurality of first bond surfaces, each of the first bond surfaces being parallel with each other at varying elevations relative to a z-axis of a 3-dimensional coordinate thereof;

a lower structure comprising one of glass fiber and carbon fiber reinforced polymer composite, the lower structure having a plurality of second bond surfaces, each of the second bond surfaces being parallel with each other at varying elevations relative to the z-axis thereof, the second bond surfaces being arranged to align with the first bond surfaces in complementing relation such that the lower structure is joined with the upper structure at the first and second bond surfaces;

an adhesive disposed between and in direct contact with the first and second bond surfaces to join the lower and upper structures at the first and second bond surfaces, defining a bond gap of between 0.25 millimeter and 1.5 millimeter between the first and second bond surfaces, wherein the first bond surfaces are disposed above the second bond surfaces when the lower and upper structures are joined; and at least one mechanical fastener disposed through one of the second bond surfaces of the lower structure and extending through the upper structure, the upper structure comprising a protection rib formed thereon opposite one of the first bond surfaces and disposed about the mechanical fastener.

19. A method of manufacturing a chassis assembly having mixed material for reduced mass, the method comprising:

providing an upper structure being one of a metallic single piece and a metallic multi-piece, the upper structure comprising a plurality of first flanges, each first flange having a first bond surface, each of the first bond surfaces being parallel with each other at varying elevations relative to a z-axis of a 3-dimensional coordinate thereof;

providing a lower structure made of a polymer composite, the lower structure comprising a plurality of second flanges, each second flange having a second bond surface, each of the second bond surfaces being parallel with each other at varying elevations relative to the z-axis thereof, the second bond surfaces being arranged to align with the first bond surfaces in complementing relation such that the lower structure is joined with the upper structure at the first and second bond surfaces;

applying an adhesive on the second bond surfaces;

aligning the first bond surfaces with the second bond surfaces; and joining the lower structure with the upper structure at the first and second bond surfaces such that the adhesive is disposed between and in direct contact with the first and second bond surfaces, defining a bond gap of between 0.25 millimeter and 1.5 millimeter between the first and second bond surfaces, wherein the first bond surfaces are disposed above the second bond surfaces when the lower and upper structures are joined.

20. The method of claim 19 wherein the polymer composite reinforcement comprises one of glass fiber and carbon fiber.

* * * * *